United States Patent [19]
Pivacek

[11] 3,876,041
[45] Apr. 8, 1975

[54] CASTER BRAKE
[75] Inventor: William J. Pivacek, Elyria, Ohio
[73] Assignee: Invacare Corporation, Elyria, Ohio
[22] Filed: Feb. 15, 1974
[21] Appl. No.: 443,031

[52] U.S. Cl. .............. 188/1 D; 16/35 D; 188/71.1
[51] Int. Cl. ............................................ B60t 1/04
[58] Field of Search .......... 16/35 R, 35 D; 188/2 R, 188/1 D, 71.1

[56] References Cited
UNITED STATES PATENTS
| | | | |
|---|---|---|---|
| 2,631,693 | 3/1953 | Konsberg | 188/24 |
| 2,987,141 | 6/1961 | Brooks | 16/35 R X |
| 3,298,467 | 1/1967 | Darnell | 188/1 D X |

*Primary Examiner*—Duane A. Reger
*Attorney, Agent, or Firm*—Frederic M. Bosworth

[57] ABSTRACT

A brake for a caster wheel wherein the anchor is attached to the caster axle at its bottom end and is secured from rotational movement along the inside of one of the legs of the caster fork. The brake shoe comprises a stiffened tire engaging shoe part and an integral, flexible, resilient carrier part which is attached to the anchor near the axle, is resiliently biased against the anchor, is flexible in the plane of the axle and is adapted to be flexed to bring the shoe part into braking contact with the tire of the caster wheel. Brake actuating means is carried by the anchor near the rim of the wheel and is fulcrumed to flex the carrier and force the shoe into braking contact with the tire of the wheel.

12 Claims, 7 Drawing Figures

3,876,041

3,876,041

CASTER BRAKE

BACKGROUND OF THE INVENTION

1. Field of the Invention

The field of my invention comprises casters and brakes therefor: More particularly caster brakes for holding caster wheels from rotation about their wheel axes and having brake applying and releasing means that is conveniently operated by foot contact and pressure.

2. Description of the Prior Art

The most pertinent prior art known to me comprises the U.S. patents to Schultz No. 2,147,064 and Jackson, No. 2,484,094.

The Schultz patent shows a caster brake comprising a radially moving brake arm and a cam lever for moving it into and out of contact with the tread of a caster wheel. The Schultz brake requires the caster forks to squeeze the cam lever resiliently to hold the brake "on" or "off." Schultz provides no resiliently yielding means between his actuator and his shoe to assure a firm, sufficient braking pressure between the shoe and the tire for endless brake applications.

The Jackson patent shows a caster brake which includes a pair of side arms to which is attached a brake shoe of resilient metal adapted to contact the wheel tread and the bearing cap upon depressing a lever and rotating an eccentric cam. The Jackson device takes no advantage of the caster fork, lies away and apart therefrom, and requires the shoe to make contact at both ends for incompatible purposes.

Two other patents of relatively less pertinence are U.S. Pats. to McIntosh, No. 2,081,594, and Noelting, et al. No. 1,863,349.

Nothing in the prior art suggests the unobstrusive disposition of my brake, nor its simplicity of removal and attachment to the caster, nor its efficiency and ease of operation.

SUMMARY OF THE INVENTION

My invention comprises a quick-detachable brake assembly for a caster which includes an anchor, a brake shoe having a stiff, tire engaging shoe part at one end, a resilient, flexible middle carrier part and a reinforced part at the other end which is secured to the anchor; the assembly also includes a foot operated brake actuator. The whole assembly, excepting only an exposed portion of the actuator is removably secured to, and concealed on the innerside of, one leg of the caster fork.

The anchor is attached to the caster axle and secured against rotation by engagement with the said leg of the caster fork. The brake shoe is attached to the anchor near the caster axle, is resiliently pressed against the anchor, is flexible in the plane of the caster axle and may be flexed to bring the tire engaging part into lateral engagement with the tire on the caster wheel. The brake actuator is fulcrumed on the anchor near the rim of the caster wheel. The actuator flexes the brake shoe into tight, secure engagement with the tire to hold the caster wheel from rotation until released by forcible movement of the actuator.

The brake embodying my invention is a complete assembly of elements which can be attached to and removed from the caster fork and axle without making any alterations in the fork or axle. My brake assembly may be installed by removing the caster wheel and axle from the fork, slipping the leg of the fork through the middle loop of the actuator so the outer loop of the actuator lies outside the leg as a pedal. Then the anchor is slid up and inside the leg until the axle hole in its lower end is aligned with the axle hole in the fork leg and the whole anchor engages the leg and lies congruent therewith. Thereupon the wheel, axle and fork are reassembled while the anchor is held in its intended place with its lower end clamped between the wheel. Removal requires merely the same steps in reverse order.

Objects of my invention are to provide a caster brake to solve the problems that have plagued the prior art, that is simple and economical in construction, reliable in use, easy to operate, readily installed and removed, is inconspicious when installed, detracts nothing from appearance of the caster and enhances the appearance by the pleasing look of the loop of the actuator. Other objects of my invention will appear from the following description of my preferred embodiment thereof.

DESCRIPTION OF PREFERRED EMBODIMENTS

Figure 1:
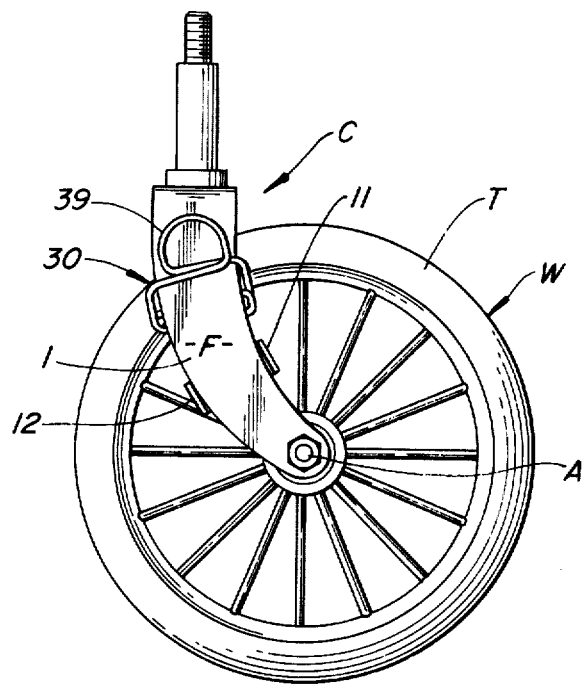
FIG. 1 is a side elevation of a caster with my caster brake attached to the inside of the near leg of the fork.
Figure 2:
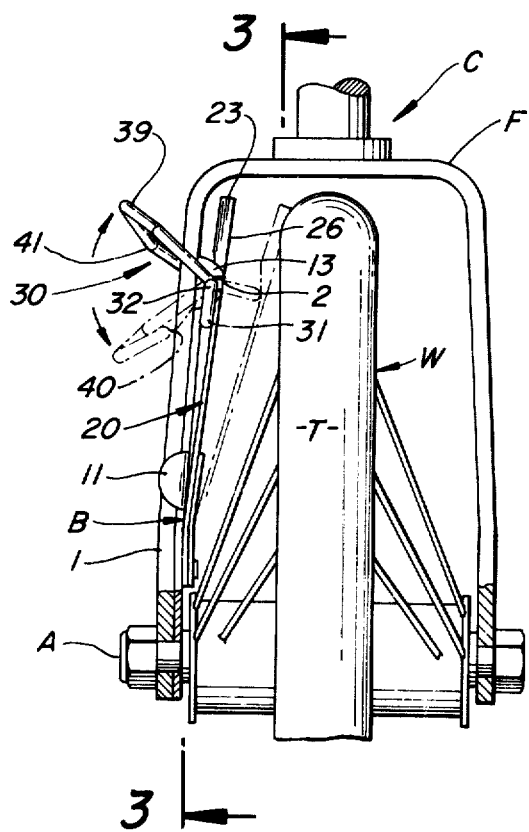
FIG. 2 is a fragmentary front elevation of the caster and brake of FIG. 1.
Figure 3:
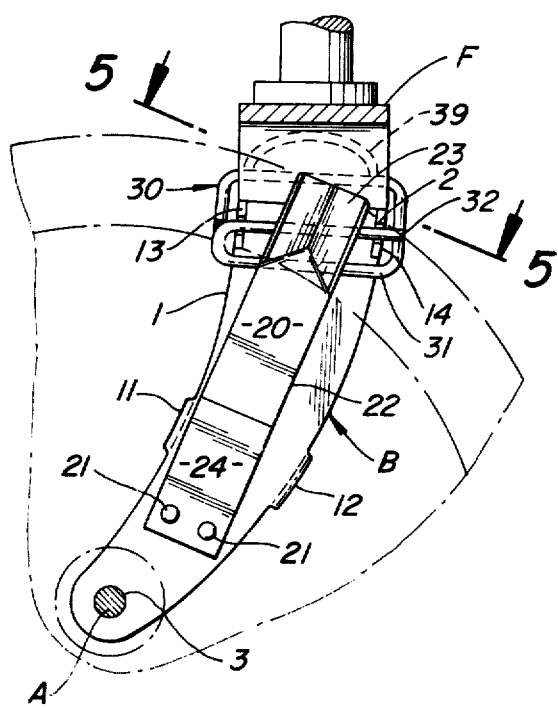
FIG. 3 is an inside view and front elevation of the caster brake of FIGS. 1 and 2 taken along bent and inclined line 3—3 of FIG. 2 wherein the said near leg of the fork is largely obscured by the innerlying brake anchor.

Referring firstly to FIGS. 1-3 of the drawings, the caster C comprises fork F, wheel W and axle A; the axle being carried in the lower apertured ends of the legs of the fork upon which the wheel is rotatably mounted. Tire T is snugly secured on the rim of wheel W. My brake assembly or brake B, see also FIG. 4, is removably attached to the inside of the "near" leg 1, as viewed in FIG. 1, of fork F where the brake shoe 20 part of brake B may be flexed into braking engagement with the tire T of the caster wheel W by the cam and lever actuator 30 as shown in dotted lines in FIG. 2.

As suggested above, the term brake shoe is employed to comprehend the whole element 20 by the flexing of the middle, carrier part 22 of which, FIG. 2, the creased and stiffened, tire-engaging upper end or shoe part 23, FIG. 3, is caused to engage and grip tire T along sharp and inclined side edges 25 and 26 of shoe part 23. Tire T is made of conventionally "solid rubber" with enough softness to cushion the ride of the vehicle supported by such casters and to yield to the edges 25 and 26 biting the tire to significant, cut-free depth to hold the wheel W securely against rotation.

Figure 4:
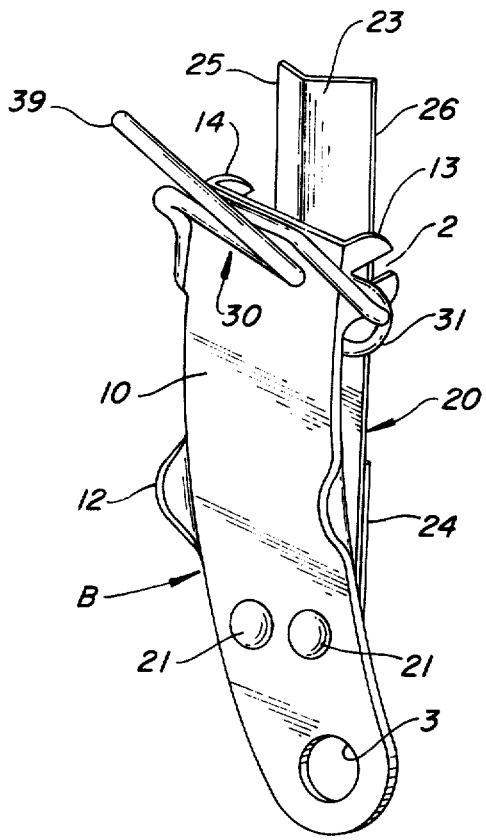
FIG. 4 is an isometric rear view of my caster brake detached from the caster with the anchor in the foreground.
Figure 5:
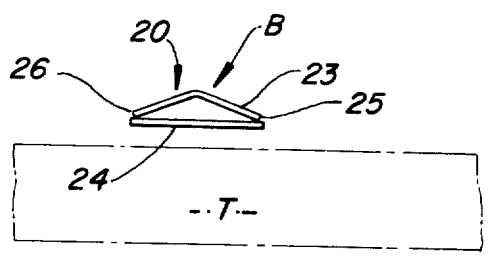
FIG. 5 is a top plan view of the upper end of my brake shoe taken along the line 5—5 of FIG. 3.

Brake shoe 20 as a whole, is made of resilient metal, and with stiffener plate 24, is securely attached to anchor 10 by spaced rivets 21 near caster axle A, FIGS. 2, 3 and 4. Plate 24 overlies and is pressed against the lowermost end portion of brake shoe 20 by rivets 21 and resists flexing of the lowermost portion of carrier part 22 when said brake shoe is flexed, FIG. 2. The upper tire-engaging part of brake shoe 20 comprises the longitudinally creased and stiffened shoe part 23 which bites the tire when brake shoe 20 is flexed and the brake is applied. Ordinarily the tire is not moving when it is forcibly engaged by the edges 25 and 26 of part 23.

Anchor 10 has a hole 3 at its lower end, FIGS. 3 and 4, through which axle A is engaged in a sliding fit. When the brake assembly B is positioned between the inside of fork leg 1 and wheel W, as described above, and the lower end of the anchor is clamped between the fork leg and the adjacent wheel bearing or bushing, the lower end of the anchor becomes firmly secured relative to the axle. Anchor 10 is additionally secured against circumferential motion relative to fork leg 1 by lateral tabs 11 and 12 which preferably have a snug taper fit with the tapered edges of the leg, FIGS. 1, 2, 3 and 4. Anchor 10 is curved and tapered like the fork leg, coincides therewith and is fairly concealed inside the leg.

The uppermost end of the anchor 10 carries notched lateral tabs 13 and 14, in the round-bottom notches 2 of which the cam and lever actuator 30 is fulcrumed and pivotally supported, FIGS. 1, 2, 3 and 4. Fulcrum part or strand 32 of actuator 30, see FIGS. 2, 3 and 6, lies in said notches 2, and cam part 31 of the actuator engages brake shoe 20 near the upper creased and stiffened part thereof as at 33, see FIGS. 2, 3 and 7.

Figure 6:
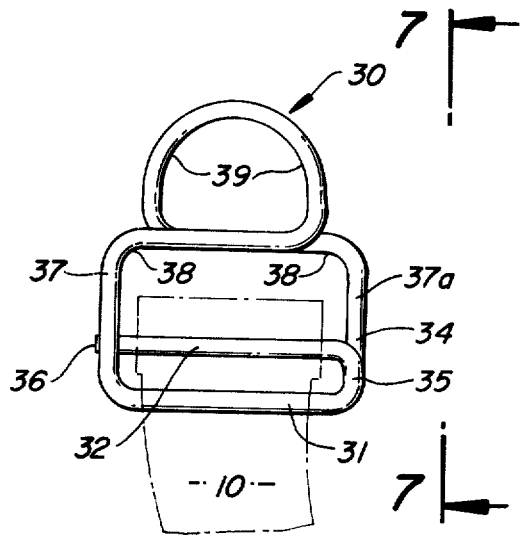
FIG. 6 is an elevation of the brake actuator viewed from the side of the anchor.
Figure 7:
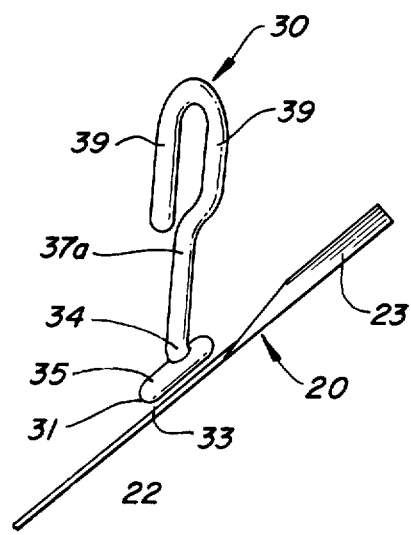
FIG. 7 is a side elevation taken from line 7—7 of FIG. 6 with a fragment of the brake shoe related to the actuator in the off position.

The cam and lever actuator 30, detached from the assembly in FIGS. 6 and 7, is preferably made of a single length of stout steel or stainless wire bent, brazed and/or plated to the form and contour shown and described herein.

As viewed in FIGS. 6 and 7, one end 34 of the wire of which the actuator is formed, is secured, i.e., brazed or welded to the upper shoulder of the return bend 35 which joins the cam 31 and fulcrum 32. The other end 36, best seen in FIG. 3, which is also the left, as viewed, end of fulcrum 32, is similarly secured to the far side, as viewed in FIG. 6, of the rising and rearwardly bent strand 37. The bend in strand 37 is not shown as such, but with its attachment to the end of the fulcrum 32 corresponds to return bend 35 and aligns the cam 31 and fulcrum 32 parallel to each other in a plane inclined to the rest of the actuator as shown in FIG. 7.

Strand 37 rises vertically and parallel with strand 37a which rises from end 34, as viewed in FIG. 6, until both strands extend clearly above the upper end of anchor 10 where both strands are turned horizontally inward, toward and alongside each other, see also FIGS. 4 and 7 to form a lower rectangular loop 38, and continued upwardly and around to form upper circular loop 39. Loop 38 encircles fork leg 1, FIGS. 1 and 2, wherewith to dispose loop 39 outside the fork where it serves as the operating pedal of the brake.

To apply the brake from the off position as shown in full lines in FIGS. 1, 2 and 4, pedal part 39 of actuator 30 is depressed to the on, dotted line, position shown in FIG. 2, swinging the actuator counterclockwise, as viewed, about fulcrum 32 to the on position. During the greater part of the brake-applying motion of the actuator, the cam 31, see also FIG. 7, bears upon and slides up and along the upper portion of the flexible carrier part 22 of the brake shoe, flexing it toward the wheel and tire, and forcibly pressing the tire engaging part 23 of the shoe into maximum, tight, biting engagement with the tire T. The lesser and last increments of counterclockwise movement of actuator 30 move cam 31 over center far enough to maintain the on condition indefinitely after downward actuating pressure has been removed from pedal 39. A minimum, desirable, surplus over-center motion of the actuator 30 is limited as shown in FIG. 2 by contact at 40 between the near strand 41, FIG. 6, of overlapping strands that are common to the loops 38 and 39 of the actuator, with the outside of fork leg 1, FIG. 2.

Release of my brake requires merely application of upward force and motion to the pedal 39, as by the toe of a boot of the operator or attendant, sufficient to move the cam 31 back over center clockwise as viewed in FIG. 2. Thereupon, the resilient bias of the stressed brake shoe will swing the actuator to the off position, full lines in FIG. 2, and slap the brake shoe back toward and upon the anchor and into stressed contact with the cam and fulcrum of the actuator as shown in FIGS. 2 and 7.

While I have illustrated and described a preferred form and embodiment of my invention, changes and improvements therein and thereupon will occur to those skilled in the art who come to use and/or understand my invention, all without departing from the essence and substance thereof. Therefore, I do not want my patent to be restricted merely to that which is specifically disclosed herein, nor in any manner inconsistent with the progress by which my invention has promoted the progess of the art.

What is claimed is:

1. A self-contained detachable caster brake adapted to be removably secured between a caster wheel and the inside of one leg of the caster fork, comprising an anchor engageable with the inside of a leg of the caster fork, a flexible brake shoe anchored to said anchor and engageable with the tire of the caster wheel, and an actuator for the brake carried by said anchor and disposed to flex said brake shoe toward and away from the caster wheel between off and on positions of the brake, said anchor being apertured at one end to receive the axle of the caster wheel and having means spaced radially from the axle for engagement circumferentially with said fork leg.

2. The brake of claim 1 wherein said actuator is fulcrumed on said anchor, has camming engagement with said brake shoe inside said fork leg and has a pedal part remote from said fulcrum adapted to lie outside of said fork leg and have actuating motion up and down the outside of said leg.

3. The brake of claim 1 wherein said actuator is fulcrumed on said anchor and has a pedal part remote from said fulcrum adapted to lie outside of said fork leg.

4. The brake of claim 2 in which said actuator comprises a loop part between said pedal and said fulcrum which is adapted to encircle said leg and make contact therewith to limit the travel of the actuator at least in the on position of the brake.

5. In a caster having a two-legged fork, an axle mounted in said fork, a brake, and a wheel with a tire mounted on said axle, the improvement comprising that the brake have a radially disposed anchor mounted on said axle inside one of said legs, and secured to said leg, a radially disposed, resilient brake shoe lying inside said anchor and facing said wheel and being flexible in the plane of said axle, said brake shoe being held against rotation about said axle by said anchor and being adapted to be flexed into contact with the tire of said wheel, and brake actuating means carried by said anchor radially near said tire to force said shoe into contact with said tire, said brake conforming to the shape of said leg and being substantially concealed thereby.

6. The improvement of claim 5 wherein said actuating means has a pedal part disposed outside said leg and movable upwardly and downwardly in the direction of said leg to release and apply the brake.

7. The improvement of claim 6 in which said actuating means comprises an inner loop part pivotally supported on said anchor and encircling said leg and comprises an outer loop forming said pedal.

8. The improvement of claim 5 wherein said anchor, brake shoe and actuating means comprises a complete, self-contained unitary assembly which is detachable from and attachable to the caster when the wheel and axle is detached from the fork without altering or modifying any part of the caster.

9. A self-contained detachable caster brake adapted to be removably secured between a caster wheel and the inside of one leg of the caster fork, comprising an anchor engageable with the inside of a fork leg of the caster, a flexible brake shoe anchored to said anchor and engageable with the tire of the caster wheel, and an actuator for the brake carried by said anchor and disposed to flex said brake shoe toward and away from the caster wheel between off and on positions of the brake, said shoe being resiliently stressed when the brake is on and said actuator being pivotally mounted to rotate about a center on said anchor and said actuator having a pedal outside said leg and having a cam part engaging said shoe which is adapted to swing over center in the on position, said stressed shoe tending to hold said cam in the on position until moved therefrom by force applied to the pedal of said actuator.

10. The brake of claim 9 wherein said pedal has one portion engagable with the outside of said leg in said on position and another portion spaced outwardly away from said leg in said on position.

11. In the combination of a caster having an axle, a fork and a wheel with a rubber-like tire mounted on the axle and a brake for holding the wheel against rotation about the axle by releasable engagement with a side of the tire, the improvement comprising that the brake be a self-contained unit readily attachable to and detachable from the inner side of one leg of said fork by sliding movement over the free lower end of, and along the length of, the leg and by coaxial engagement of said unit and said leg with said axle, said brake comprising a rigid part engaging said axle at the lower end of said part, an actuator pivotally carried by said part at the upper end of said part and having a swingable pedal portion within which said leg passes, said rigid part engaging said leg detachably and circumferentially at a place spaced radially from said axle, said brake also comprising resilient shoe part secured at its lower end to said rigid part proximate said axle and disposed between said rigid part and said wheel and approximately aligned with said leg and having an upper end engagable with said tire and engagable by said actuator.

12. The improvement of claim 11 wherein said rigid part has spaced slots at its upper end aligned at right angles to the length of the brake and opening toward said shoe part for mounting said actuator pivotally and removably, said actuator having parallel strands spaced lengthwise of the brake and disposed in angled relation to and connected with said pedal portion, one of said strands being disposed in said slots in the pivotal axis of the actuator and the other strand having camming engagement with said shoe part, said one of said strands being resiliently confined in said slots by said shoe part.

* * * * *